United States Patent
Kitao et al.

(10) Patent No.: US 11,537,192 B2
(45) Date of Patent: Dec. 27, 2022

(54) POWER CONTROL FOR A CONTROLLED DEVICE AND COMMUNICATION RELAY UNIT OF AN IMAGE PROCESSING APPARATUS

(71) Applicant: KYOCERA Document Solutions Inc., Osaka (JP)

(72) Inventors: Tomoyuki Kitao, Osaka (JP); Atsushi Suzuki, Osaka (JP); Koichi Tanaka, Osaka (JP); Tetsuo Tomimatsu, Osaka (JP); Masayuki Shigetomi, Osaka (JP); Hitoshi Matsumoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/172,237

(22) Filed: Feb. 10, 2021

(65) Prior Publication Data

US 2021/0247835 A1    Aug. 12, 2021

(30) Foreign Application Priority Data

Feb. 12, 2020    (JP) .............................. JP2020-021412

(51) Int. Cl.
*G06F 1/3234*    (2019.01)
*H04N 1/00*    (2006.01)
(Continued)

(52) U.S. Cl.
CPC .......... *G06F 1/3268* (2013.01); *G06F 1/3284* (2013.01); *H04N 1/00896* (2013.01);
(Continued)

(58) Field of Classification Search
CPC .... G06F 1/3206; G06F 1/3287; G06F 1/3268; G06F 2201/88; G06F 1/266; G06F 1/325;
(Continued)

(56) References Cited

U.S. PATENT DOCUMENTS

2016/0291677 A1* 10/2016 Saisho ................. G06F 3/0676
2018/0024602 A1*  1/2018 Matsumoto .......... G06F 1/3237
                                                    713/320
(Continued)

FOREIGN PATENT DOCUMENTS

JP    2008-055633    3/2008
JP    2012-153094    8/2012

*Primary Examiner* — Ji H Bae
(74) *Attorney, Agent, or Firm* — Lex IP Meister, PLLC

(57) ABSTRACT

An image processing apparatus includes a connection unit, a first power supply unit, a second power supply unit, and a control device. The connection unit is connected to an electronic apparatus including a controlled device and a communication relay unit. The first power supply unit can supply power to the controlled device. The second power supply unit can supply power to the communication relay unit. The control device is capable of switching a power supply state by the first power supply unit and the second power supply unit between at least a first stop state in which power supply by the first power supply unit is continued and power supply by the second power supply unit is stopped and a second stop state in which power supply by the first power supply unit and the second power supply unit is stopped.

8 Claims, 5 Drawing Sheets

(51) Int. Cl.
　　　*G06F 1/3206*　　　(2019.01)
　　　*G06F 1/3287*　　　(2019.01)
　　　*G06F 1/26*　　　　(2006.01)

(52) U.S. Cl.
　　　CPC ..... *H04N 1/00904* (2013.01); *H04N 1/00907* (2013.01); *G06F 1/266* (2013.01); *G06F 1/325* (2013.01); *G06F 1/3206* (2013.01); *G06F 1/3287* (2013.01); *G06F 2201/88* (2013.01)

(58) Field of Classification Search
　　　CPC .............. G06F 1/3284; H04N 1/00896; H04N 1/00904; H04N 1/00907
　　　USPC .................................. 713/320, 324; 377/15
　　　See application file for complete search history.

(56) References Cited

U.S. PATENT DOCUMENTS

| | | | |
|---|---|---|---|
| 2018/0210539 A1* | 7/2018 | Hashimoto | G06F 3/0625 |
| 2018/0364793 A1* | 12/2018 | Wang | G06F 1/3206 |
| 2019/0115752 A1* | 4/2019 | Saunders | H02J 1/06 |

* cited by examiner

FIG. 3

| OPERATION MODE | | EN1 | EN2 | EN3 | FIRST POWER SUPPLY UNIT | SECOND POWER SUPPLY UNIT |
|---|---|---|---|---|---|---|
| NORMAL MODE | | H | H | L | ON | ON |
| POWER SAVING MODE | FIRST STOP STATE | H | L | H | ON | OFF |
| | SECOND STOP STATE | L | L | L | OFF | OFF | ately be a trade-off between power saving of the image

POWER CONTROL FOR A CONTROLLED DEVICE AND COMMUNICATION RELAY UNIT OF AN IMAGE PROCESSING APPARATUS

INCORPORATION BY REFERENCE

This application is based upon and claims the benefit of priority from the corresponding Japanese Patent Application No. 2020-021412 filed on Feb. 12, 2020, the entire contents of which are incorporated herein by reference.

BACKGROUND

The present disclosure relates to an image processing apparatus including a controlled device such as a hard disk drive.

In an image processing apparatus such as a multifunction peripheral to which a controlled device such as a hard disk drive can be connected, the power supply of the controlled device is sometimes controlled to be turned off and on for the purpose of suppressing power consumption of the image processing apparatus. On the other hand, if the power supply of the controlled device is repeatedly turned off and on, the life of the controlled device may be shortened. In order to extend the life of the controlled device, it is desirable to suppress the number of times the power supply of the controlled device is turned off and on. As described above, there may be a trade-off between power saving of the image processing apparatus and life lengthening of the controlled device.

A communication relay unit for relaying communication between the controlled device and the image processing apparatus may be provided between the controlled device and the image processing apparatus. For example, the communication relay unit converts a communication signal between the controlled device and the image processing apparatus when a communication protocol between the controlled device and the image processing apparatus is different. The communication relay unit of this type has less influence on the life due to the off-on of the power supply than a controlled device such as a hard disk drive has. Therefore, when the number of times of turning off and on the power supply of the communication relay unit together with the controlled device is suppressed in consideration of life lengthening of the controlled device, power may be wastefully consumed in the communication relay unit.

SUMMARY

An image processing apparatus according to the present disclosure includes a connection unit, a first power supply unit, a second power supply unit, and a control device. The connection unit is connected to an electronic apparatus including a controlled device and a communication relay unit that relays communication between the controlled device and the image processing apparatus via a cable including a plurality of wires. The first power supply unit can supply power from the image processing apparatus to the controlled device via a first power supply line connected to the controlled device among the plurality of wires. The second power supply unit can supply power from the image processing apparatus to the communication relay unit via a second power supply line connected to the communication relay unit among the plurality of wires. The control device is capable of switching a power supply state by the first power supply unit and the second power supply unit between at least a first stop state in which power supply to the controlled device by the first power supply unit is continued and power supply to the communication relay unit by the second power supply unit is stopped and a second stop state in which power supply to the controlled device and the communication relay unit by the first power supply unit and the second power supply unit is stopped.

BRIEF DESCRIPTION OF THE DRAWINGS

FIG. 3 is a view for explaining the power supply state of the control device in the image processing apparatus according to the embodiment of the present disclosure.

DETAILED DESCRIPTION

An embodiment of the present disclosure will now be described with reference to the accompanying drawings, which are examples of embodiments that embody the present disclosure and are not intended to limit the technical scope of the present disclosure.

Configuration of the Image Processing Apparatus 1

Figure 1:
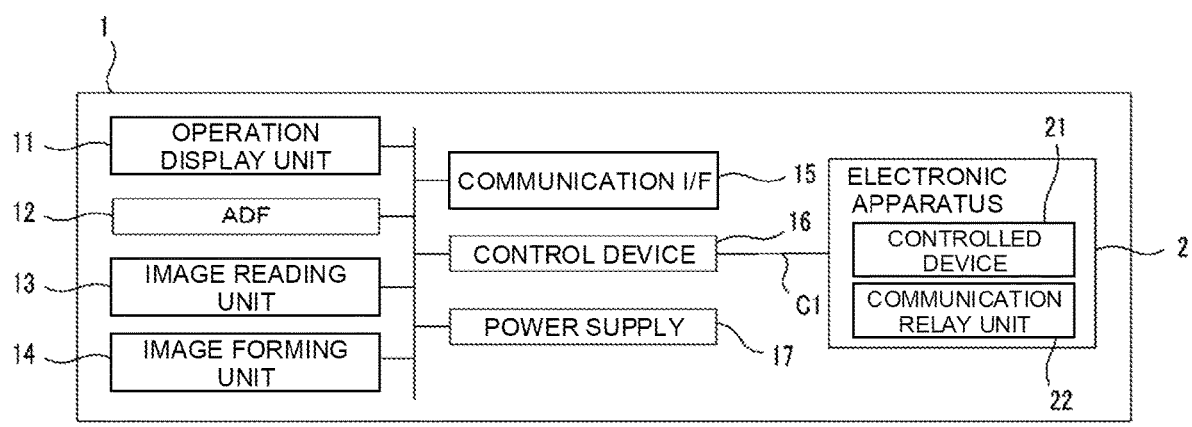
FIG. 1 is a block diagram showing a configuration of an image processing apparatus according to an embodiment of the present disclosure.

As illustrated in FIG. 1, an image processing apparatus 1 according to an embodiment of the present disclosure includes an operation display unit 11, an ADF 12, an image reading unit 13, an image forming unit 14, a communication I/F 15, a control device 16, a power supply 17, an electronic apparatus 2, and the like. The image processing apparatus 1 is a multifunction peripheral having a printer function, a copy function, a facsimile function, and the like, in addition to a scanner function of reading an image from a document. Note that the present disclosure is not limited to a multifunction peripheral, and can be applied to any image processing apparatus such as a copying machine, a scanner apparatus, and a facsimile apparatus.

The power supply 17 converts electric power supplied from a commercial AC power supply (not illustrated) or the like into various predetermined voltages, and supplies the voltages to the operation display unit 11, the ADF 12, the image reading unit 13, the image forming unit 14, the communication I/F 15, the control device 16, the electronic apparatus 2, and the like. For example, the power supply 17 supplies a DC voltage such as 5 V used in the control device 16 to the control device 16. The DC voltage is supplied from the power supply 17 to the electronic apparatus 2 via the control device 16.

The operation display unit 11 includes a display unit such as a liquid crystal display that displays information, and an operation unit such as a touch panel and operation buttons that receive user operations. The ADF 12 is an automatic document feeder that includes a document setting unit, a conveyance roller, a document presser, and a paper discharge unit, and conveys a document to be subjected to image reading by the image reading unit 13.

The image reading unit 13 reads an image of a document and generates image data. The image reading unit 13 includes an image sensor and various optical devices. The image forming unit 14 can execute print processing based on image data by an electrophotographic method or an inkjet method. For example, the image forming unit 14 can form an image on a sheet based on image data read from a document by the image reading unit 13. For example, when the image forming unit 14 is an electrophotographic image forming unit, the image forming unit 14 includes a photosensitive drum, a charger, an exposure device, a developing device, a transfer device, a fixing device, and the like.

The communication I/F 15 is a communication interface capable of executing communication processing according to a predetermined communication protocol with an external information processor such as a facsimile machine or a personal computer via a communication network such as a phone line, the Internet, or a LAN.

The control device 16 controls the image processing apparatus 1. Various electronic apparatuses 2 can be connected to the control device 16 by a cable C1. The cable C1 is a USB cable or the like, including a plurality of wires.

The electronic apparatus 2 includes a controlled device 21 and a communication relay unit 22. The controlled device 21 is a control target controlled by the control device 16 and includes a drive unit such as a motor. Specifically, in the present embodiment, the controlled device 21 is a storage device such as a hard disk drive including a motor that rotationally drives a disk that is a recording medium. In particular, in the present embodiment, it is assumed that the controlled device 21 is a hard disk drive capable of executing communication processing in accordance with a communication protocol of SATA (Serial ATA) (an example of a second communication protocol). The controlled device 21 stores image data read by the image reading unit 13, various control programs, and the like.

The communication relay unit 22 relays communication processing between the control device 16 and the controlled device 21. Specifically, when the communication protocol of the control device 16 and the communication protocol of the controlled device 21 are different from each other, the communication relay unit 22 mutually converts communication signals input and output based on the respective communication protocols and relays communication processing between the control device 16 and the controlled device 21. Specifically, in the present embodiment, it is assumed that the control device 16 can execute communication processing in accordance with a communication protocol of a universal serial bus (USB) (an example of a first communication protocol) different from that of the controlled device 21. That is, the communication relay unit 22 performs communication conversion between SATA and USB, and realizes communication processing between the control device 16 and the controlled device 21. The combination of the first communication protocol and the second communication protocol is not limited thereto, and may be a combination of other communication protocols, for example, the communication protocol of the control device 16 may be SATA and the communication protocol of the controlled device 21 may be USB.

The controlled device 21 is connected to the image processing apparatus 1 via one cable C1 as one electronic apparatus 2 together with the communication relay unit 22, and power is supplied to the controlled device 21 and the communication relay unit 22 via the cable C1. Conventionally, in such a configuration, it is difficult to individually control power supply to the controlled device 21 and the communication relay unit 22 connected to the image processing apparatus 1 by one cable C1, and it is not possible to achieve power saving and a long life of the controlled device in a well-balanced manner. On the other hand, in the image processing apparatus 1 according to the present embodiment, it is possible to achieve power saving and a long life of the controlled device in a well-balanced manner.

Hereinafter, the control device 16 and the electronic apparatus 2 will be described with reference to FIG. 2.

Control Device 16

Figure 2:
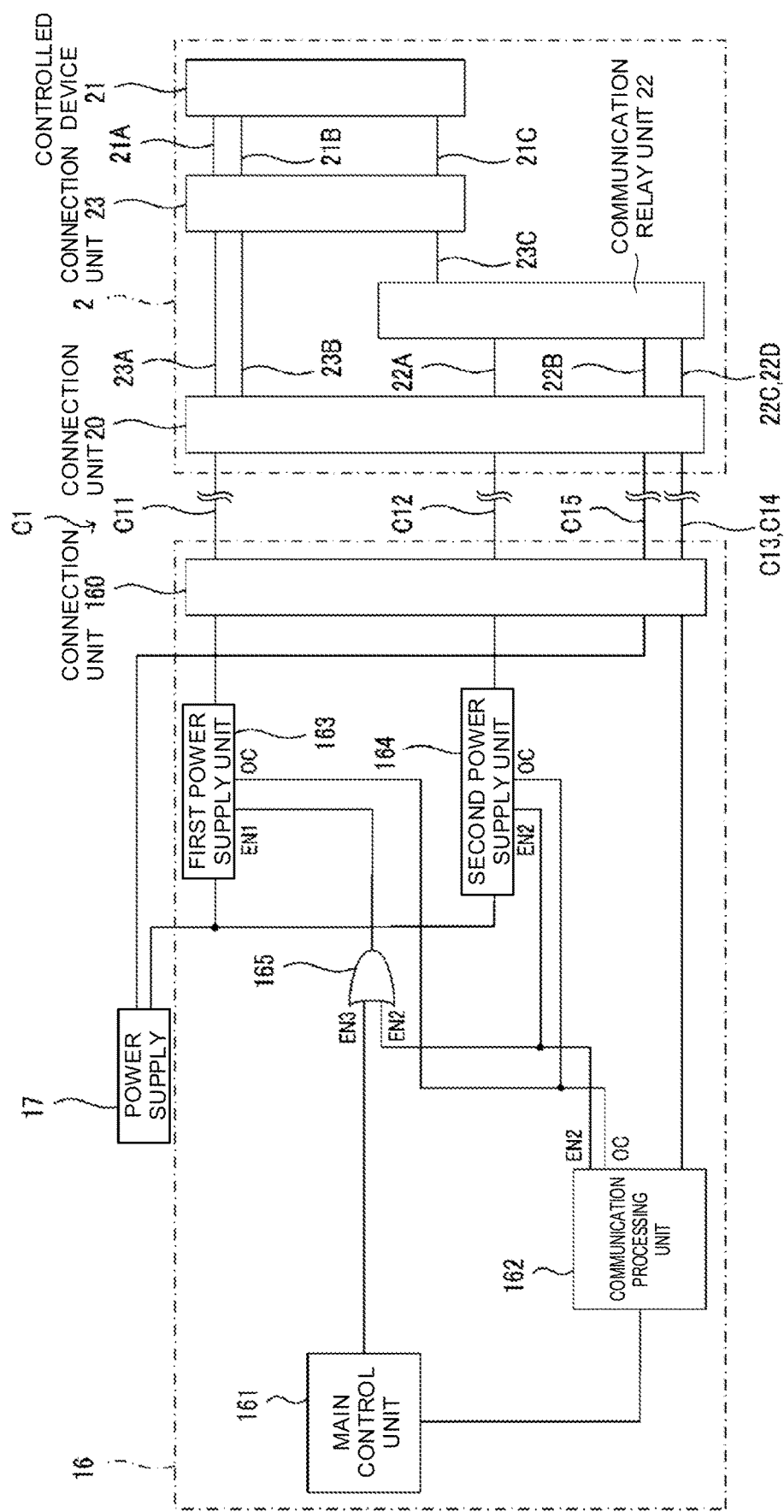
FIG. 2 is a diagram showing a configuration of a control device and an electronic apparatus of an image processing apparatus according to the embodiment of the present disclosure.

As illustrated in FIG. 2, the control device 16 includes a connection unit 160, a main control unit 161, a communication processing unit 162, a first power supply unit 163, a second power supply unit 164, a switching processing unit 165, and the like. For connection of various components in the control device 16 described here, cable wiring may be used, or a pattern formed on a substrate may be used.

A cable C1 including a plurality of wires corresponding to the communication standard of the communication processing unit 162 can be connected to the connection unit 160. In this embodiment, the cable C1 corresponds to the USB standard, and the cable C1 includes five wires. In the image processing apparatus 1, the five wires included in the cable C1 are used as a first power supply line C11, a second power supply line C12, a communication line C13, a communication line C14, and a ground line C15.

The main control unit 161 includes control devices such as a CPU, a ROM, a RAM, and an EEPROM (registered trademark), and functions as a computer that controls the image processing apparatus 1. The CPU is a processor that executes various types of arithmetic processing. The ROM is a nonvolatile storage unit in which information such as a control program for causing the CPU to execute various processes is stored in advance. The RAM is a volatile storage unit used as a temporary storage memory (work area) for various processes executed by the CPU. The EEPROM is a nonvolatile storage unit used as a temporary storage memory (work area) for various processes executed by the CPU.

The main control unit 161 includes an output port capable of outputting a third control signal EN3, and the switching processing unit 165 is connected to the output port. The main control unit 161 can switch whether or not to output the third control signal EN3 to the switching processing unit 165.

Specifically, in the image processing apparatus 1, the main control unit 161 executes processing for shifting the operation mode to the power saving mode when a power saving mode shift condition set in advance for shifting the operation mode of the image processing apparatus 1 to the power saving mode in which power consumption is suppressed more than in the normal mode is satisfied. For example, the power saving mode shift condition is that an idle time in which a user operation, an image reading process, an image forming process, and the like are not performed in the image processing apparatus 1 continues for a predetermined specific time or more. The power saving mode shift condition may include that a user performs a shift operation to the power saving mode. In the power saving mode, the power supply 17 stops supplying power to some preset components such as the display unit of the operation display unit 11, the image reading unit 13, and the image forming unit 14. When the operation mode of the image processing apparatus 1 is the power saving mode and a preset normal mode shift condition is satisfied, the main control unit 161 executes a process of shifting the image processing apparatus 1 from the power saving mode to the normal mode. For example, the normal mode shift condition is that a user operation is performed, that a start request for image reading processing, image forming processing, or the like is generated, or the like.

When the power saving mode shift condition is satisfied and a specific condition set in advance is satisfied, the main control unit 161 outputs the third control signal EN3 to the switching processing unit 165. On the other hand, when the power saving mode shift condition is satisfied and the specific condition is not satisfied, the main control unit 161 does not output the third control signal EN3 to the switching processing unit 165.

In the present embodiment, a state in which various signals such as the third control signal EN3 are output is a state in which the signal level of the signals is "H (high)", and a state in which various signals are not output is a state in which the signal level of the signals is "L (low)". As another embodiment, the control device 16 may have a circuit configuration that operates in a so-called low active state in which the control device 16 is in an output state when the signal level is "L" as long as the control device 16 can perform the same operation as the control device 16 described in the present embodiment.

The specific condition is that the number of times of activation of the controlled device 21 has reached a preset upper limit number of times or more. The main control unit 161 stores the number of times of activation of the controlled device 21 in the EEPROM or the like. The number of times of activation is synonymous with the number of times of power-on of the controlled device 21. For example, the upper limit number of times is set in advance as the number of times that the number of times the power of the controlled device 21 is turned off and on affects the life of the controlled device 21. The upper limit number of times may be set in advance for each model of the controlled device 21, and the main control unit 161 may switch the upper limit number of times according to the model of the controlled device 21. The main control unit 161 can identify each controlled device 21 based on unique identification information received from the controlled device 21, and stores the number of times of activation for each controlled device 21 in the EEPROM or the like.

The communication processing unit 162 is connected to the main control unit 161, and can execute communication processing with the electronic apparatus 2 according to a predetermined communication protocol based on a control instruction from the main control unit 161. Specifically, in the present embodiment, the communication processing unit 162 can execute communication processing in accordance with a USB communication protocol. The communication processing unit 162 includes an output port capable of outputting a second control signal EN2, and the output port is connected to each of the switching processing unit 165 and the second power supply unit 164. Based on the control instruction from the main control unit 161, the communication processing unit 162 outputs the second control signal EN2 when the power saving mode shift condition is not satisfied, and does not output the second control signal EN2 when the power saving mode shift condition is satisfied.

The communication processing unit 162 includes an input port to which a detection signal OC can be input, and the first power supply unit 163 and the second power supply unit 164 are connected to the input port. That is, the input port is an input port commonly used by the first power supply unit 163 and the second power supply unit 164. When the detection signal OC is input to the input port, the communication processing unit 162 determines that an overcurrent has occurred in one of the first power supply unit 163 and the second power supply unit 164.

The first power supply unit 163 is connected to the power supply 17 and the connection unit 160. The first power supply unit 163 can supply power to the controlled device 21 via a first power supply line C11 connected to the controlled device 21 among a plurality of wires included in the cable C1 connected to the connection unit 160. To be specific, the first power supply unit 163 supplies power to the controlled device 21 in response to the input of a first control signal EN1, and stops supplying power to the controlled device 21 when the first control signal EN1 is not input.

The first power supply unit 163 can detect an overcurrent on the power supply path of the first power supply unit 163. When detecting the overcurrent, the first power supply unit 163 inputs the detection signal OC to the communication processing unit 162. The first power supply unit 163 may include a known overcurrent detection circuit using a resistive element or the like, and a description thereof will be omitted here.

The second power supply unit 164 is connected to the power supply 17 and the connection unit 160. The second power supply unit 164 can supply power to the communication relay unit 22 via a second power supply line C12 connected to the communication relay unit 22 among a plurality of wires included in the cable C1 connected to the connection unit 160. To be specific, the second power supply unit 164 supplies power to the communication relay unit 22 in response to the input of the second control signal EN2, and stops supplying power to the communication relay unit 22 when the second control signal EN2 is not input.

The second power supply unit 164 can detect an overcurrent on the power supply path of the second power supply unit 164. When detecting the overcurrent, the second power supply unit 164 inputs the detection signal OC to the communication processing unit 162. Note that the second power supply unit 164 may include a known overcurrent detection circuit using a resistive element or the like, and a description thereof will be omitted here.

The switching processing unit 165 is a logic circuit such as an OR circuit that outputs the first control signal EN1 to the first power supply unit 163 when at least one of the second control signal EN2 and the third control signal EN3 is input (when the signal level is "H"). Therefore, when neither the second control signal EN2 nor the third control signal EN3 is input, the switching processing unit 165 does not output the first control signal EN1 to the first power supply unit 163.

In the image processing apparatus 1, the control device 16 can switch a power supply state by the first power supply unit 163 and the second power supply unit 164 between at least a first stop state and a second stop state. In particular, in the present embodiment, when the operation mode of the image processing apparatus 1 is the power saving mode, the control device 16 switches the power supply state by the first power supply unit 163 and the second power supply unit 164 between the first stop state and the second stop state. The first stop state is a state in which the power supply to the communication relay unit 22 by the second power supply unit 164 is stopped while the power supply to the controlled device 21 by the first power supply unit 163 is continued. The second stop state is a state in which power supply to the controlled device 21 and the communication relay unit 22 by the first power supply unit 163 and the second power supply unit 164 is stopped. When the image processing apparatus 1 is in the normal mode, the power supply state by the first power supply unit 163 and the second power supply unit 164 is switched to a power supply state different from the first stop state and the second stop state.

FIG. 3 is a diagram showing a power supply state by the first power supply unit 163 and the second power supply unit 164 in each operation mode of the image processing apparatus 1. FIG. 3 illustrates the power supply states (ON/OFF) of the first power supply unit 163 and the second power supply unit 164 in the states of the first control signal EN1, the second control signal EN2, and the third control signal EN3.

As shown in FIG. 3, in the control device 16, when the operation mode of the image processing apparatus 1 is the normal mode, the second control signal EN2 is "H" and the third control signal EN3 is "L". Since the second control signal EN2 is "H", the first control signal EN1 is "H". Thus, in the normal mode, both the first control signal EN1 and the second control signal EN2 are "H", so that the power supply states of the first power supply unit 163 and the second power supply unit 164 are ON.

In the control device 16, when the operation mode of the image processing apparatus 1 is the power saving mode and the first stop state, the second control signal EN2 is "L" and the third control signal EN3 is "H". Since the third control signal EN3 is "H", the first control signal EN1 is "H". Accordingly, in the first stop state, since the first control signal EN1 is "H" and the second control signal EN2 is "L", the power supply state of the first power supply unit 163 is ON and the power supply state of the second power supply unit 164 is OFF.

Further, in the control device 16, when the operation mode of the image processing apparatus 1 is the power saving mode and during the second stop state, both the second control signal EN2 and the third control signal EN3 are "L", and the first control signal EN1 is "L". As a result, in the second stop state, the power supply state of the first power supply unit 163 and the second power supply unit 164 are both OFF.

Electronic Apparatus 2

As illustrated in FIG. 2, the electronic apparatus 2 includes a connection unit 20, the controlled device 21, the communication relay unit 22, a connection portion 23, and the like. Note that in connection of various components in the electronic apparatus 2 described here, cable wiring may be used, or a pattern formed on a substrate may be used.

A cable C1 corresponding to the communication standard of the communication processing unit 162 can be connected to the connection unit 20. As described above, the cable C1 includes five wires used as the first power supply line C11, the second power supply line C12, the communication line C13, the communication line C14, and the ground line C15. The controlled device 21 is connected to the connection portion 23 via a SATA cable or the like including a power supply line 21A, a ground line 21B, and a communication line 21C.

In the electronic apparatus 2, the first power supply line C11 is connected to the controlled device 21 via the connection unit 20, a power supply line 23A, the connection portion 23, and the power supply line 21A. The second power supply line C12 is connected to the communication relay unit 22 via the connection unit 20 and a power supply line 22A. The communication line C13 and the communication line C14 are connected to the communication relay unit 22 via the connection unit 20, the communication line 22C and the communication line 22D. The communication relay unit 22 is connected to the controlled device 21 via a communication line 23C, the connection portion 23, and the communication line 21C. Note that the communication line 23C and the communication line 21C include the number of wires suitable for the communication protocol of the controlled device 21. Further, the ground line C15 is connected to the controlled device 21 via the connection unit 20, a ground line 23B, the connection portion 23, and the ground line 21B, and is connected to the communication relay unit 22 via a ground line 22B.

As a result, the controlled device 21 operates by being supplied with power from the first power supply line C11 and the ground line C15, and the communication relay unit 22 operates by being supplied with power from the second power supply line C12 and the ground line C15. The communication relay unit 22 converts signals transmitted from the control device 16 via the communication lines C13, C14, 22C, and 22D into signals conforming to the communication protocol of the controlled device 21, and inputs the signals to the controlled device 21 via the communication line 23C, the connection portion 23, and the communication line 21C. On the other hand, the communication relay unit 22 converts signals transmitted from the controlled device 21 via the communication line 21C, the connection portion 23, and the communication line 23C into signals conforming to the communication protocol of the control device 16, and inputs the signals to the control device 16 via the communication lines 22C, 22D, C13, and C14. Thus, communication processing between the control device 16 and the controlled device 21 is realized. For example, the controlled device 21 executes recording or reading of various types of information on the basis of the communication process with the control device 16.

Power Supply Control Process

Figure 4:
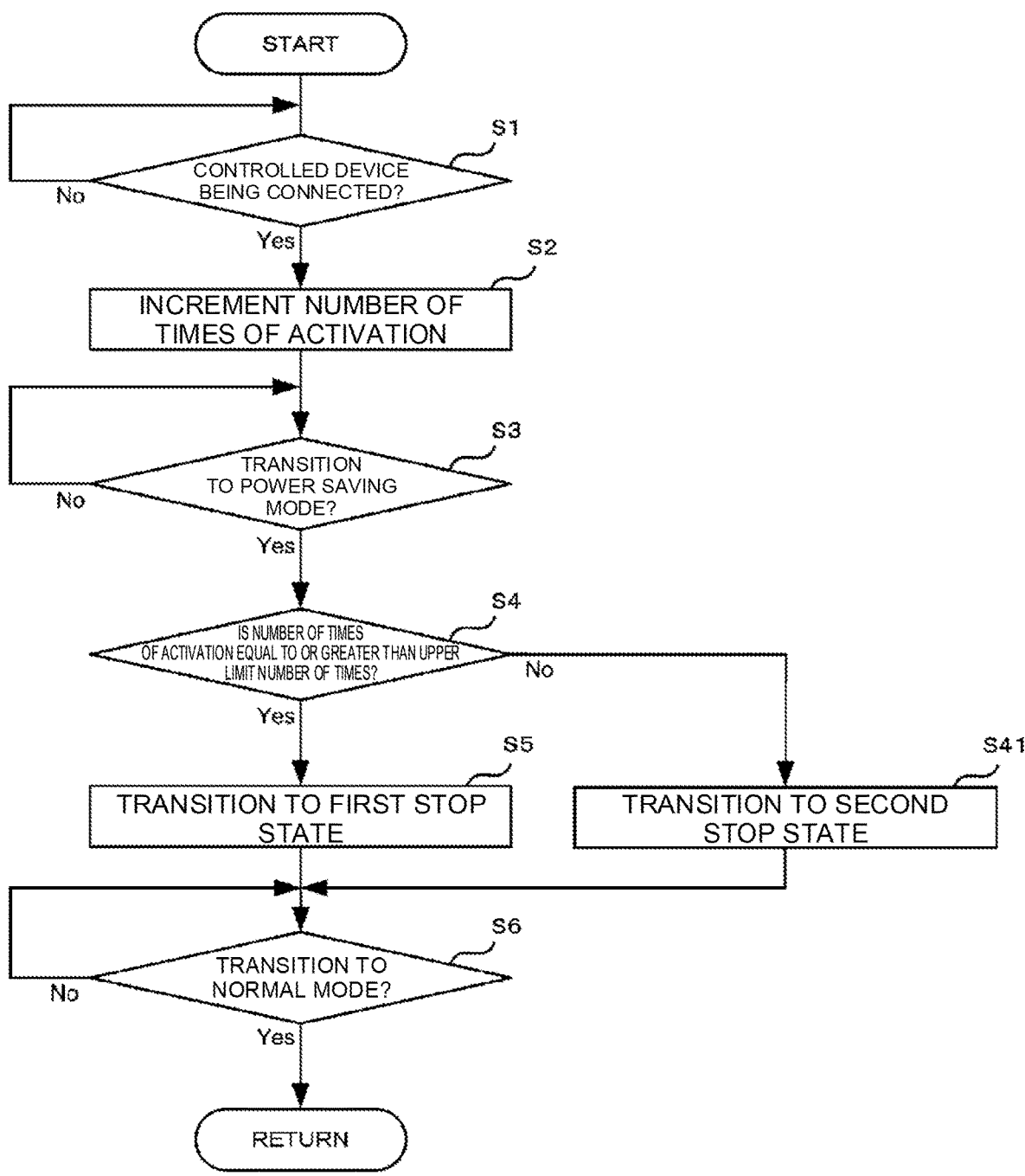
FIG. 4 is a flowchart showing an example of a procedure of power supply control process executed in the image processing apparatus according to the embodiment of the present disclosure.

Next, an example of a power supply control process executed by the main control unit 161 in the image processing apparatus 1 will be described with reference to a flowchart of FIG. 4. In addition to the power supply control process, the main control unit 161 executes various processes such as an image reading process and an image forming process, but description thereof will be omitted. Note that the present disclosure may be regarded as a disclosure of a power supply control method for executing a part or all of the power supply control process in the image processing apparatus 1 or a power supply control program for causing a computer such as the main control unit 161 to execute the power supply control method.

The power supply control process is executed by the main control unit 161 when the image processing apparatus 1 is turned on by turning on a power switch (not illustrated) of the image processing apparatus 1. When the image processing apparatus 1 is turned on, power supply from the power supply 17 to the control device 16 is started, and components such as the main control unit 161, the communication processing unit 162, the first power supply unit 163, the second power supply unit 164, and the switching processing unit 165 become operable.

Step S1

In step S1, the main control unit 161 determines whether or not the controlled device 21 is connected. If it is determined that the controlled device 21 is connected (S1: Yes), the process proceeds to step S2. Until it is determined that the controlled device 21 is connected (S1: No), the process waits in step S1.

Specifically, when the image processing apparatus 1 is powered on, the main control unit 161 does not output the third control signal EN3 to the switching processing unit 165, and the communication processing unit 162 does not output the second control signal EN2 to the switching processing unit 165 and the second power supply unit 164. After the image processing apparatus 1 is powered on, the communication processing unit 162 performs activation processing such as preparation for connection of a downstream port. When the activation processing ends, the communication processing unit 162 shifts the power supply state by the first power supply unit 163 and the second power supply unit 164 to the power supply state corresponding to the normal mode (see FIG. 3). That is, the communication processing unit 162 starts outputting the second control signal EN2. Thus, the first power supply unit 163 and the second power supply unit 164 can supply power to the controlled device 21 and the communication relay unit 22. When the controlled device 21 and the communication relay unit 22 are connected, the controlled device 21 and the communication relay unit 22 start operating. When the communication processing unit 162 receives a predetermined signal transmitted from the controlled device 21, the main control unit 161 recognizes that the controlled device 21 is connected and starts communication with the controlled device 21.

Step S2

In step S2, the main control unit 161 increments the number of times of activation of the controlled device 21 stored in the EEPROM or the like by 1. Note that the main control unit 161 newly stores the number of times of activation corresponding to the controlled device 21 recognized for the first time, in the EEPROM. For example, the number of times of activations of the controlled device 21 is stored in the EEPROM or the like in association with the unique identification information of the controlled device 21.

The increment of the number of times of activation of the controlled device 21 may not be performed after the number of times of activation reaches the upper limit number of times.

Step S3

In step S3, the main control unit 161 determines whether or not the power saving mode shift condition is satisfied in the image processing apparatus 1. Here, when it is determined that the power saving mode shift condition is satisfied (S3: Yes), the process is shifted to step S4. Until it is determined that the power saving mode shift condition is satisfied (S3: No), the process stands by in step S3.

Step S4

In step S4, the main control unit 161 determines whether or not the number of times of activation of the controlled device 21 is equal to or greater than the upper limit number of times. That is, in step S4, it is determined whether or not the specific condition is satisfied. Here, when it is determined that the number of times of activation is equal to or greater than the upper limit number of times (S4: Yes), the process proceeds to step S5. In step S4, when it is determined that the number of times of activation is not equal to or greater than the upper limit number of times (S4: No), the process proceeds to step S41.

Step S41

In step S41, the main control unit 161 shifts the power supply state by the first power supply unit 163 and the second power supply unit 164 to the second stop state of the power saving mode, and shifts the processing to step S6.

Specifically, the main control unit 161 does not output the third control signal EN3 and inputs a control instruction for stopping the output of the second control signal EN2 to the communication processing unit 162, whereby the communication processing unit 162 stops the output of the second control signal EN2 and the power supply from the first power supply unit 163 and the second power supply unit 164 to the controlled device 21 and the communication relay unit 22 is stopped. The controlled device 21 and the communication relay unit 22 are turned off. Note that step S41 may be performed after a shutdown signal is transmitted from the main control unit 161 to the controlled device 21 and a signal indicating that the controlled device 21 is in a shutdown-enabled state is received from the main control unit 161.

Step S5

In step S5, the main control unit 161 shifts the power supply state by the first power supply unit 163 and the second power supply unit 164 to the first stop state of the power saving mode, and shifts the processing to step S6.

Specifically, the main control unit 161 outputs the third control signal EN3 and inputs a control instruction for stopping the output of the second control signal EN2 to the communication processing unit 162, so that the communication processing unit 162 stops the output of the second control signal EN2. The switching processing unit 165 inputs the first control signal EN1 to the first power supply unit 163 in response to the input of the third control signal EN3. As a result, the power supply from the first power supply unit 163 to the controlled device 21 is continued and the power supply of the controlled device 21 is maintained in the ON state, but the power supply from the second power supply unit 164 to the communication relay unit 22 is stopped. Therefore, the power of the communication relay unit 22 is turned off.

Step S6

In step S6, the main control unit 161 determines whether or not the normal mode shift condition is satisfied. Here, in a case where it is determined that the normal mode shift condition is satisfied (S6: Yes), the process proceeds to the step S1. Until it is determined that the normal mode shift condition is satisfied (S6: No), the process waits in step S6.

As described above, in the image processing apparatus 1, the main control unit 161 can switch the power supply state by the first power supply unit 163 and the second power supply unit 164 in the power saving mode between at least the first stop state and the second stop state. Thus, when the number of times of activation of the controlled device 21 is less than the upper limit number of times at the time of shift to the power saving mode, it is possible to achieve power saving by the second stop state. Further, when the number of times of activation of the controlled device 21 is equal to or greater than the upper limit number of times at the time of shift to the power saving mode, it is possible to extend the life of the controlled device 21 by the first stop state. As described above, the image processing apparatus 1 can achieve power saving and a long life of the controlled device 21 in a balanced manner. In addition, in the image processing apparatus 1, since the communication processing unit 162 may be provided with one output port for outputting the second control signal EN2, it is not necessary to individually prepare output ports corresponding to the first power supply unit 163 and the second power supply unit 164.

In the present embodiment, the configuration in which the power supply state by the first power supply unit 163 and the second power supply unit 164 in the power saving mode can be switched between the first stop state and the second stop state according to the number of times of activation of the controlled device 21 has been described as an example. On the other hand, the operation mode of the image processing apparatus 1 may include a plurality of stages of power saving modes. In this case, as the power supply state by the first power supply unit 163 and the second power supply unit 164, the first stop state and the second stop state may be selected according to the type of the power saving mode. For example, when the idle time continues for a predetermined time or longer in the normal mode, the power supply state by the first power supply unit 163 and the second power supply unit 164 may shift to the first stop state, and thereafter, when the idle time continues for another predetermined time or longer, the power supply state by the first power supply unit 163 and the second power supply unit 164 may shift to the second stop state. As another embodiment, the power supply state by the first power supply unit 163 and the second power supply unit 164 may be switched between the first stop state and the second stop state in response to any other event. That is, the specific condition may be an arbitrary condition set in advance.

Overcurrent Protection Operation

In the image processing apparatus 1, an overcurrent may occur on the power supply paths of the first power supply unit 163 and the second power supply unit 164 due to various factors such as a failure of the electronic failure of the electronic apparatus 2 or a poor connection of the cable C1. Therefore, the control device 16 has an overcurrent protection function of stopping power supply by the first power supply unit 163 and the second power supply unit 164 when an overcurrent is detected by each of the first power supply unit 163 and the second power supply unit 164.

Figure 5:
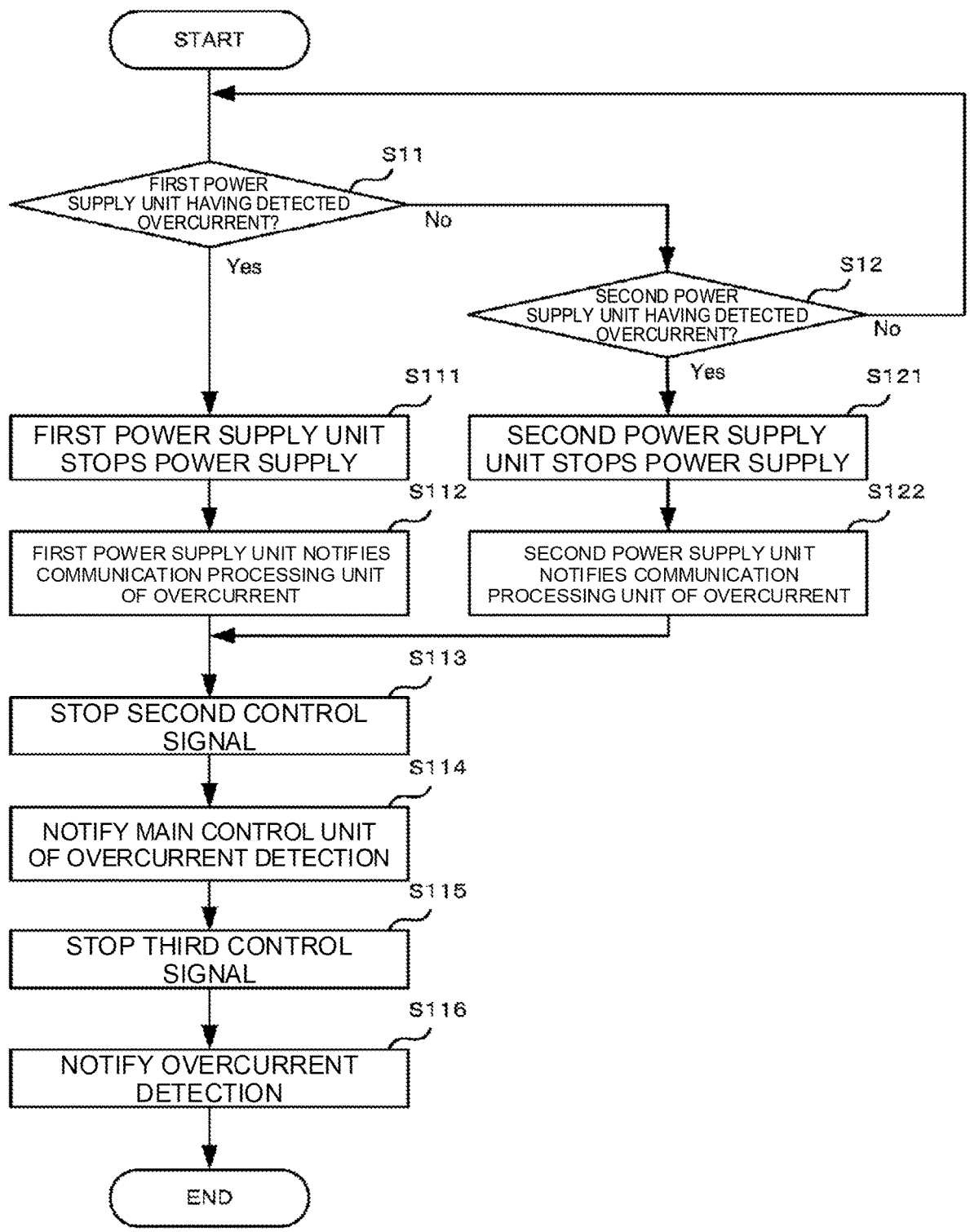
FIG. 5 is a flowchart showing an example of an overcurrent protection operation in the image processing apparatus according to the embodiment of the present disclosure.

Hereinafter, an example of the overcurrent protection operation in the image processing apparatus 1 will be described with reference to the operation flow of FIG. 5.

Steps S11 to S12

First, in steps S11 to S12, the operation branches depending on whether or not an overcurrent is detected on the power supply path by the first power supply unit 163 and the second power supply unit 164. To be specific, when the first power supply unit 163 detects an overcurrent on the power supply path (S11: Yes), step S111 is executed. If the overcurrent on the power supply path is not detected by the first power supply unit 163 (S11: No), step S12 is executed. When the overcurrent on the power supply path is detected by the second power supply unit 164 (S12: Yes), step S121 is executed. If the overcurrent on the power supply path is not detected by the second power supply unit 164 (S12: No), the operation flow returns to step S11.

Step S111

In step S111, the first power supply unit 163 stops power supply. This suppresses damage to the first power supply unit 163, the power supply 17, the controlled device 21, and the like.

Step S112

In step S112, the first power supply unit 163 outputs the detection signal OC for notifying the occurrence of the overcurrent, to the communication processing unit 162.

Step S113

In step S113, the communication processing unit 162 stops the output of the second control signal EN2 in response to the input of the detection signal OC. Thus, when the operation mode of the image processing apparatus 1 is the normal mode, power supply from both the first power supply unit 163 and the second power supply unit 164 is stopped. That is, when an overcurrent occurs in the first power supply unit 163, not only the power supply by the first power supply unit 163 but also the power supply by the second power supply unit 164 is stopped.

Step S114

In step S114, the communication processing unit 162 notifies the main control unit 161 of overcurrent detection.

Step S115

In step S115, the main control unit 161 stops the output of the third control signal EN3. Thus, when the operation mode of the image processing apparatus 1 is the normal mode, if an overcurrent occurs in the second power supply unit 164, power supply from the first power supply unit 163 is stopped by the step S115. That is, when an overcurrent occurs in the second power supply unit 164, not only the power supply by the second power supply unit 164 but also the power supply by the first power supply unit 163 is stopped.

Step S116

In step S116, the main control unit 161 executes a notification process of notifying the user of the occurrence of an overcurrent using the operation display unit 11 or the like. Thus, the user of the image processing apparatus 1 can recognize the occurrence of the overcurrent. In the notification process, the occurrence of an overcurrent may be notified to a preset destination by e-mail or the like.

Step S121

On the other hand, when an overcurrent is detected by the second power supply unit 164 (S12: Yes), the second power supply unit 164 stops the power supply in the subsequent step S121. This suppresses damage to the second power supply unit 164, the power supply 17, the communication relay unit 22, and the like.

Step S122

In step S122, the second power supply unit 164 outputs the detection signal OC for notifying the occurrence of the overcurrent, to the communication processing unit 162. After that, in the image processing apparatus 1, processing of the step S113 and thereafter is executed.

As described above, in the image processing apparatus 1, when the detection signal OC is input to the communication processing unit 162, the power supply by each of the first power supply unit 163 and the second power supply unit 164 is stopped. In the image processing apparatus 1, it is sufficient that the communication processing unit 162 is provided with one input port described above, to which the detection signal OC is input, and it is possible to provide protection against the overcurrent, without individually preparing input ports corresponding to the first power supply unit 163 and the second power supply unit 164.

What is claimed is:

1. An image processing apparatus comprising:
a control device that effects control of the image processing apparatus; and
an electronic apparatus that includes a controlled device to be controlled by the control device, and a communication relay unit that relays communication between the controlled device and the control device,
wherein the control device comprises:
a connection unit that connects the control device and the electronic apparatus via a cable including a plurality of wires;
a first power supply unit that supplies power from the image processing apparatus to the controlled device via a first power supply line among the plurality of wires, the first power supply line being connected to the controlled device;
a second power supply unit that supplies power from the image processing apparatus to the communication relay unit via a second power supply line among the plurality of wires, the second power supply line being connected to the communication relay unit; and
a main control unit that switches a power supply state by the first power supply unit and the second power supply unit between at least a first stop state in which power supply to the controlled device by the first power supply unit is continued and power supply to the communication relay unit by the second power supply unit is stopped and a second stop state in which power supply to the controlled device and the communication relay unit by the first power supply unit and the second power supply unit is stopped.

2. The image processing apparatus according to claim 1,
wherein the first power supply unit supplies power to the controlled device in response to an input of a first control signal,
wherein the second power supply unit supplies power to the communication relay unit in response to an input of a second control signal,
wherein the main control unit that outputs a third control signal when a specific condition set in advance is satisfied, and
wherein the control device further comprises:
a switching processing unit that outputs the first control signal to the first power supply unit when at least one of the second control signal and the third control signal is input; and
a communication processing unit connected to the second power supply unit and the switching processing unit, that executes processing for communication with the electronic apparatus in accordance with a predetermined communication protocol and outputs the second control signal to the second power supply unit and the switching processing unit.

3. The image processing apparatus according to claim 2,
wherein the specific condition is that the number of times of activation of the controlled device reaches a preset upper limit number of times,
wherein the communication processing unit does not output the second control signal in a case where a power saving mode shift condition set in advance is satisfied in order to shift an operation mode of the image processing apparatus to a power saving mode in which power consumption is suppressed more than in a normal mode, and
wherein the main control unit outputs the third control signal when the power saving mode shift condition is satisfied and the specific condition is satisfied, and does not output the third control signal when the power saving mode shift condition is satisfied and the specific condition is not satisfied.

4. The image processing apparatus according to claim 2,
wherein the communication processing unit is arranged to execute communication processing in accordance with a first communication protocol,
wherein the controlled device is arranged to execute communication processing in accordance with a second communication protocol different from the first communication protocol, and
wherein the communication relay unit mutually converts communication signals according to the first communication protocol and the second communication protocol, and relays communication between the communication processing unit and the controlled device.

5. The image processing apparatus according to claim 4,
wherein the first communication protocol is USB, and
wherein the second communication protocol is SATA.

6. The image processing apparatus according to claim 5,
wherein the cable is a USB cable including five wires of the first power supply line, the second power supply line, two signal lines used for communication between the image processing apparatus and the controlled device, and a ground line.

7. The image processing apparatus according to claim 1,
wherein the controlled device is a hard disk drive.

8. The image processing apparatus according to claim 1,
wherein the first power supply unit is arranged to detect an overcurrent on the first power supply line,
wherein the second power supply unit is arranged to detect an overcurrent on the second power supply line, and
wherein the control device stops power supply by the first power supply unit and the second power supply unit when an overcurrent is detected by the first power supply unit or the second power supply unit.

* * * * *